(12) United States Patent
Wobben

(10) Patent No.: US 6,945,752 B1
(45) Date of Patent: Sep. 20, 2005

(54) AZIMUTHAL DRIVING SYSTEM FOR WIND TURBINES

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 09/856,654
(22) PCT Filed: Oct. 12, 1999
(86) PCT No.: PCT/EP99/07655
§ 371 (c)(1), (2), (4) Date: Aug. 27, 2001
(87) PCT Pub. No.: WO00/31413
PCT Pub. Date: Jun. 2, 2000

(30) Foreign Application Priority Data

Nov. 26, 1998 (DE) .......................................... 198 54 683
May 5, 1999 (DE) .......................................... 199 20 504

(51) Int. Cl.⁷ ............................................ F01D 25/00
(52) U.S. Cl. ...................... 416/170 R; 415/2.1; 290/44; 310/77
(58) Field of Search ........................ 416/170 R; 415/2.1, 415/4.1, 4.2, 4.3, 4.4, 4.5, 906, 907, 908; 290/44, 55; 310/77, 92, 93

(56) References Cited

U.S. PATENT DOCUMENTS

| | | | | |
|---|---|---|---|---|
| 2,733,393 A | * | 1/1956 | Carlisle | |
| 4,047,832 A | | 9/1977 | Sforza ............................. | 415/1 |
| 4,066,911 A | | 1/1978 | Sarchet ......................... | 290/44 |
| 4,088,352 A | | 5/1978 | Kling ............................ | 290/55 |

(Continued)

FOREIGN PATENT DOCUMENTS

| | | |
|---|---|---|
| DE | 33 06 980 A1 | 9/1984 |
| DE | 299200 A5 | 4/1992 |
| DE | 19717059 C1 | 9/1997 |
| DE | 199 55 586 A1 | 6/2001 |
| EP | 0 624 834 A2 | 11/1994 |
| FR | 1 145 328 | 10/1957 |
| JP | 6-351273 | 12/1994 |
| JP | 7-245973 | 9/1995 |

OTHER PUBLICATIONS

R. Gash, "Windkraftanlagen," B.G. Teubner, Stuttgart, 1999, p. 72 & 90.

Hau, Erich, "Windkraftanlagen,"Springer–Verlag, Berlin, 1998, p. 279–281.

Primary Examiner—Edward K. Look
Assistant Examiner—Richard A. Edgar
(74) Attorney, Agent, or Firm—Seed IP Law Group PLLC (57) ABSTRACT

Wind power installations generally have an active drive for wind direction tracking. The active drive rotates the machine housing of the wind power installation in such a way that the rotor blades of the rotor are oriented in the direction of the wind. Multiple azimuthal drives are typically used for larger wind power installations. The present invention includes a wind power installation comprising a machine housing, a rotor with at least one rotor blade, and a displacement device for orientating the rotor in the direction of the wind. The displacement device has a three-phase asynchronous motor drive that is supplied with three-phase current and is at times or completely acted upon with direct current during the stoppage time of the machine housing. Thus improved displacement devices, such as azimuthal drives, are provided ensuring uniform load distribution for each drive and preventing unwanted torque fluctuations in the individual drives.

19 Claims, 5 Drawing Sheets

U.S. PATENT DOCUMENTS

| | | | |
|---|---|---|---|
| 4,116,581 A | 9/1978 | Bolie | 415/2 |
| 4,160,170 A | 7/1979 | Harner et al. | 290/44 |
| 4,161,658 A | 7/1979 | Patrick | 290/44 |
| 4,189,648 A | 2/1980 | Harner | 290/44 |
| 4,193,005 A | 3/1980 | Kos et al. | 290/44 |
| 4,305,030 A * | 12/1981 | Lorenz | 318/758 |
| 4,554,980 A | 11/1985 | Doniwa | 173/12 |
| 4,692,094 A * | 9/1987 | Kulinyak | 416/11 |
| 4,700,081 A | 10/1987 | Kos et al. | 290/44 |
| 4,703,189 A | 10/1987 | DiValentin et al. | 290/44 |
| 4,871,923 A | 10/1989 | Scholz et al. | 290/55 |
| 4,966,525 A * | 10/1990 | Nielsen | 416/9 |
| 5,035,575 A | 7/1991 | Nielsen et al. | 416/9 |
| 5,149,998 A * | 9/1992 | Wolcott | 310/105 |
| 5,172,310 A * | 12/1992 | Deam et al. | 363/144 |
| 5,178,518 A * | 1/1993 | Carter, Sr. | 416/11 |
| 5,198,734 A | 3/1993 | Johnson | 318/369 |
| 5,213,470 A | 5/1993 | Lundquist | 416/9 |
| 5,315,159 A | 5/1994 | Gribnau | 290/55 |
| 5,374,885 A | 12/1994 | Küppers et al. | 318/757 |
| 5,447,412 A * | 9/1995 | Lamont | 415/4.2 |
| 5,746,576 A | 5/1998 | Bayly | 416/16 |
| 5,828,195 A * | 10/1998 | Zalesski | 318/366 |
| 5,910,688 A | 6/1999 | Li | 290/55 |
| 5,977,649 A | 11/1999 | Dahill | 290/55 |
| 5,986,370 A * | 11/1999 | Cheng | 310/77 |
| 6,118,678 A * | 9/2000 | Limpaecher et al. | 363/60 |
| 6,261,138 B1 * | 7/2001 | Imura | 440/8 |
| 6,420,795 B1 * | 7/2002 | Mikhail et al. | 290/44 |
| 6,541,877 B2 | 4/2003 | Kim et al. | 290/44 |
| 6,710,468 B1 | 3/2004 | Marrero O'Shanahan | 290/55 |
| 6,774,504 B1 | 8/2004 | Lagerwey | 290/44 |
| 6,800,956 B2 | 10/2004 | Bartlett | 290/55 |

\* cited by examiner

AZIMUTHAL DRIVING SYSTEM FOR WIND TURBINES

CROSS-REFERENCE TO RELATED APPLICATIONS

Not Applicable.

STATEMENT REGARDING FEDERALLY SPONSORED RESEARCH OF DEVELOPMENT

Not Applicable.

REFERENCE TO A "SEQUENCE LISTING," A TABLE, OR A COMPUTER PROGRAM

Not Applicable.

BACKGROUND OF THE INVENTION

1. Field of the Invention
2. Description of the Related Art

Wind power installations generally have an active drive for wind direction tracking. The active drive rotates the machine housing of the wind power installation in such a way that the rotor blades of the rotor are oriented in the direction of the wind. That drive which is required for wind direction tracking purposes is generally an azimuthal drive which is usually disposed with the associated azimuthal mountings between the tower top and the machine housing. One displacement drive is sufficient when small wind power installations are involved, while larger wind power installations are generally equipped with a plurality of azimuthal drives.

In the procedure involving wind direction tracking of the machine housing, an operating wind-measuring system supplies a mean value for the wind direction over a certain period of time, for example 10 seconds. That mean value is repeatedly compared to the instantaneous azimuthal position of the machine housing. As soon as a deviation exceeds a given value, the machine housing is suitably re-adjusted so that the deviation of the rotor from the wind direction, being the yaw angle, is as small as possible in order to avoid power losses. The way in which wind direction tracking is implemented in the case of known wind power installations is described in "Windkraftanlagen" ("Wind Power Installations"), Erich Hau, second edition, 1995, pages 268 ff and 316 ff respectively.

In previously known wind power installations, motor-powered wind direction tracking of the machine housing, the azimuthal displacement system, takes over the function of automatically orienting the rotor and the machine housing according to the direction of the wind. When considered functionally, the wind direction tracking system is an independent unit. When considered from the point of view of structure, it forms the transition of the machine housing to the tower top. The components thereof are integrated in part in the machine housing and in part in the tower top. The overall system for wind direction tracking comprises the components consisting of the setting drive, holding brakes, locking device, azimuthal mountings and regulating system. Those components operate as follows:

For the setting drive, there are the alternatives hydraulic or electrical, in a similar manner as for the rotor blade displacement drive. Both design configurations are usual in relation to wind power installations. Small installations mostly have unregulated electrical drive motors. In the case of large installations, hydraulic setting drives are in the majority.

A rotary movement-check arrangement or a yaw brake is required in order to prevent the yaw moment about the axis of rotation having to be maintained after the tracking operation has been effected, by drive motors. Otherwise, the service life of the drive assemblies or the upstream-connected transmission assemblies could scarcely be guaranteed. Small installations are generally satisfied with a rotary movement-check arrangement in the azimuthal mounting, while a plurality of releasable holding brakes are known for larger installations. The holding brakes engage a braking ring at the inside of the tower or conversely a ring on the machine housing. During the tracking operation one or two azimuthal brakes are in engagement in order to guarantee the required damping action for the displacement dynamics. In this case the setting drive must be designed in such a way that it can perform the tracking movement against that frictional damping action. The azimuthal or tower top mounting is usually in the form of a rolling bearing assembly.

Figure 7:
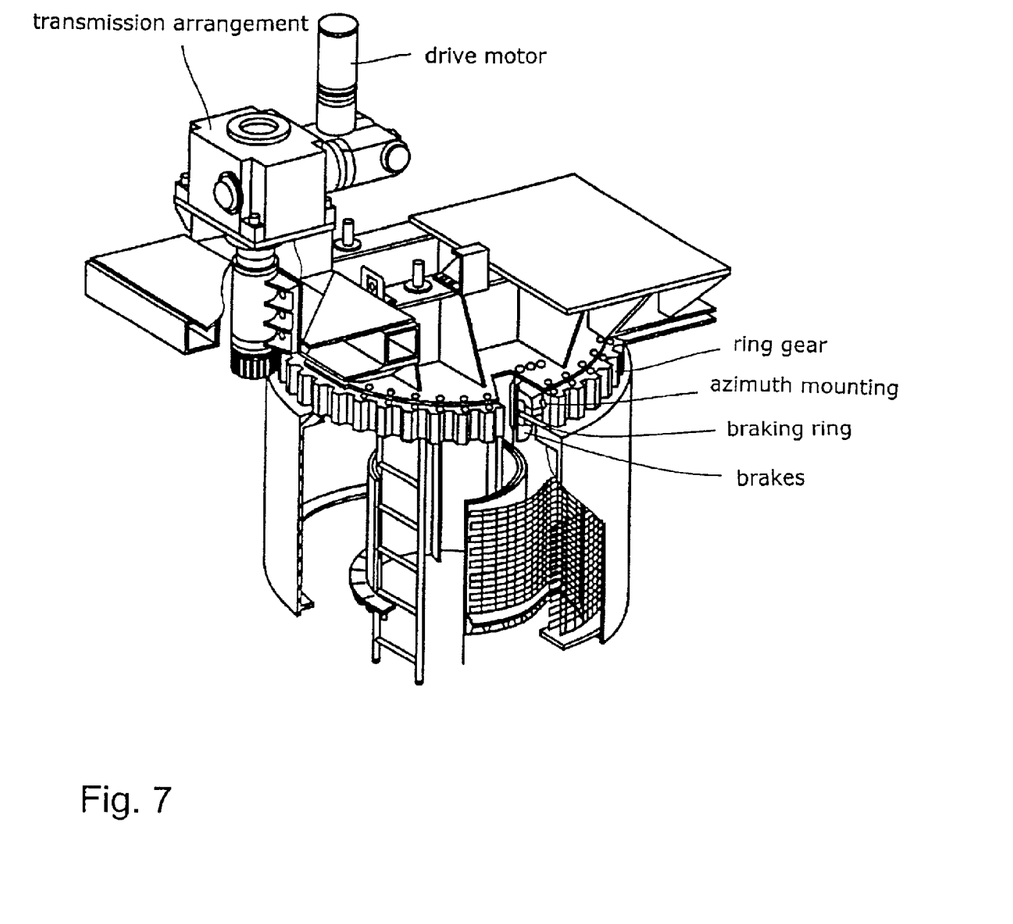
FIG. 7 is a partly sectional view of a known wind tracking arrangement with an electric setting drive.

FIG. 7 is a partly sectional view of a known wind direction tracking system with an electrical setting drive from Westinghaus WT G-0600.

During operation of a wind power installation with turbulent winds—in dependence on the axis of rotation of the rotor—very high forces occur and, linked thereto, high and frequent load peaks in the azimuthal drives.

If there is more than one azimuthal drive, the situation additionally involves a very high degree of asymmetry in the individual drives. Those drives have a step-up transmission ratio by means of a transmission assembly of around 15,000. Very minor deviations in the tooth configuration at the periphery of the tower mounting result immediately in very severe asymmetries if more than one drive, for example four azimuthal drives, are mounted at the periphery of the tower mounting with an integrated tooth arrangement. Because of the high transmission step-up ratio those small deviations on the input side of the drive correspond to up to between 15 and 20 revolutions on the output side.

In consequence this means that, during and after each rotational procedure for the machine housing, the entire load and the entire rotary moment must be uniformly distributed if possible simultaneously to individual drives. In addition, when heavy azimuthal loads are involved, the drives should yield during the stoppage times when excessively high load levels occur, and permit easy rotary movement of the machine housing so that a suitable load relief effect can occur.

In addition, during the wind tracking movement of the machine housing of the wind power installation, in the event of severe turbulence, correspondingly high torques also occur. They excite the azimuthal drives in such a way that the motors oscillate in mutually opposite relationship. In that case the transmission arrangements with their very high step-up transmission ratio react like a spring and the consequence is major torque fluctuations in the individual drives.

BRIEF SUMMARY OF THE INVENTION

The object of the invention is to improve the azimuthal drive for wind power installations so that the above-indicated problems are eliminated, providing a structurally simple azimuthal drive, ensuring uniform load distribution for each azimuthal drive, and preventing unwanted torque fluctuations in the individual drives.

In accordance with the invention there is proposed a wind power installation as set forth in claim 1. Advantageous developments are described in the appendant claims.

The wind power installation according to the invention comprising a machine housing which accommodates a rotor with at least one rotor blades is distinguished in that the displacement device for displacement of the machine housing in accordance with the respective wind direction has as its azimuthal drive at least one three-phase asynchronous motor which is supplied with three-phase current during displacement of the machine housing and at times or completely with direct current during the stoppage time of the machine housing.

After the displacement operation by means of three-phase current the motors are switched off and thus no longer produce any torque. In order now also to provide for a braking action on the part of the drive motor and in order still to maintain an adequate braking torque during the stoppage time when load peaks occur, the three-phase asynchronous motor is acted upon by a direct current immediately after separation from the three-phase network. That direct current generates a stationary magnetic field in the asynchronous motor which is thereby immediately decelerated. As far as possible the direct current supply is maintained during the entire stoppage time.

In accordance with the invention there is provided a torque control for suppressing unwanted torque fluctuations. Deceleration of the three-phase asynchronous motor can be set linearly by means of the magnitude of the direct current. That affords a simple torque control for the azimuthal drives of wind power installations during the actual stoppage phase.

In addition, if the displacement device has a plurality of three-phase asynchronous motors, the three-phase asynchronous motors are coupled in negative feedback relationship by means of a current transformer so that the individual drive is stabilized and the hitherto unwanted spring effect is suppressed.

BRIEF DESCRIPTION OF THE SEVERAL VIEWS OF THE DRAWING(S)

The invention is described in greater detail hereinafter by means of an embodiment with reference to the drawings in which.

DETAILED DESCRIPTION OF THE INVENTION

Wind power installations generally have an active drive for wind direction tracking. The active drive rotates the machine head of the wind power installation in such a way that the rotor blades of the rotor are oriented in optimum fashion in the direction of the wind.

Figure 1:
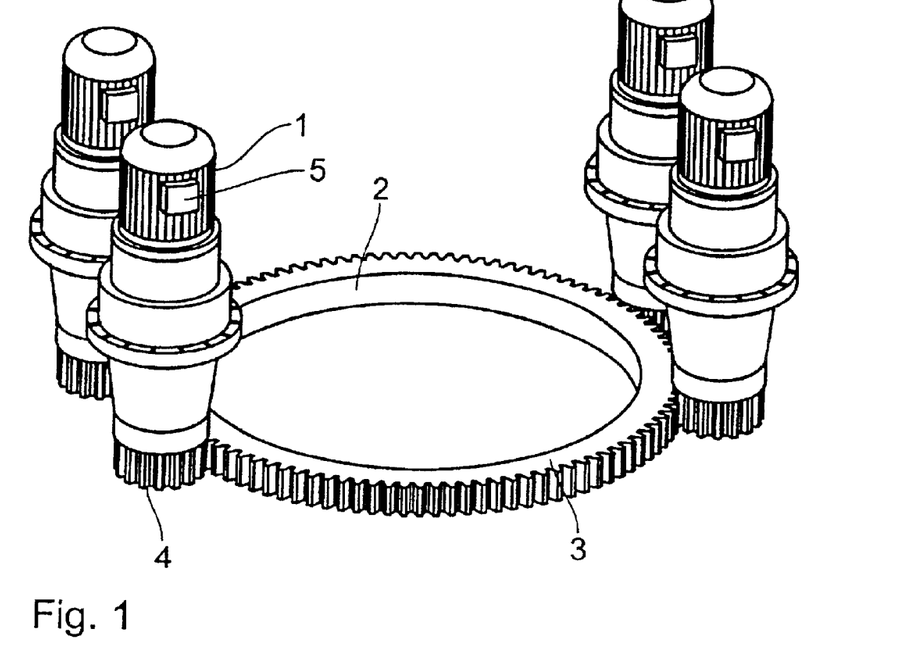
FIG. 1 diagrammatically shows an arrangement of four azimuthal drives of a displacement device on the machine housing.

The active drive for wind direction tracking is an azimuthal drive 1 with the associated azimuthal mounting 2 and is generally disposed between the tower top and the machine housing. In the case of small wind power installations one azimuthal drive is sufficient, while larger wind-power installations are usually provided with a plurality of drives, for example four drives as shown in FIG. 1. The four drives are distributed uniformly around the periphery of the tower top 3 (a non-uniform distribution is also possible).

During operation of a wind power installation with turbulent winds—in dependence on the angle of rotation of the rotor—very high forces occur and, linked thereto, high and frequent load peaks in the azimuthal drives.

If the displacement device for displacement of the machine head has more than one azimuthal drive 1, a very high level of asymmetry additionally occurs in the individual drives 1. The drives have a step-up transmission arrangement 4 (transmission arrangement: not shown) with a step-up transmission ratio of about 15,000. Very small deviations in the tooth configuration of the transmission arrangements at the periphery of the tower mounting result immediately in very severe asymmetries if more than one drive is mounted at the periphery of the tower mounting with integrated tooth configuration. Because of the high transmission ratio those minor deviations on the input side of the drive correspond to up to between 15 and 20 revolutions on the output side.

That means that, during and after each rotary procedure of the tower top, the entire load/torque must be distributed uniformly to individual drives. In addition, in the event of heavy azimuthal loads, the drives should yield during the stoppage times—of the tower top—in the event of excessively high loads, and permit a slight rotary movement of the machine head.

Each azimuthal drive 1 has its own motor 5 and the motors are interconnected and are controlled jointy. If, during the wind tracking movement of the machine head of the wind power installation—caused by severe turbulence—major torques occur, those torques excite the azimuthal drives in such a way that the motors oscillate in mutually opposite relationship or have a tendency to perform oscillations. The transmission arrangements 4 with their very high ratio react in that case like a spring, which results in major torque fluctuations in the individual drives.

Figure 2:
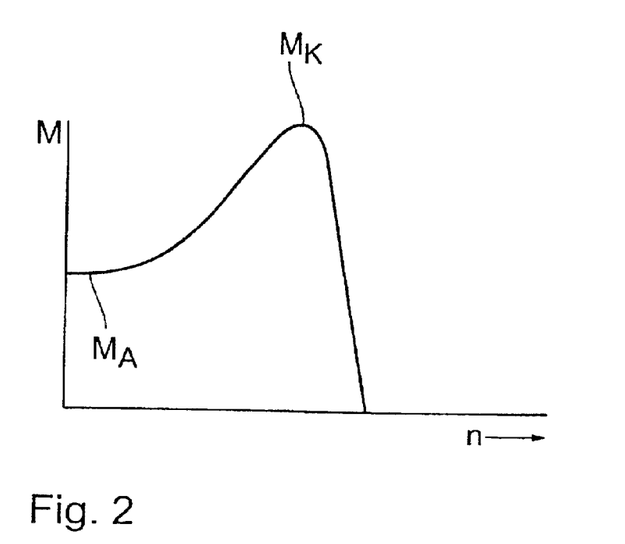
FIG. 2 shows a torque/rotary speed characteristic curve of a three-phase asynchronous motor.

In order to ensure uniform distribution of the loads during the time in which the machine housing is not rotated, it is proposed in accordance with the invention that, as drive motors for azimuthal drive purposes, a three-phase asynchronous motor is used as the asynchronous drive machine. The torque/rotary speed characteristic curve thereof is shown in FIG. 2. $M_A$ denotes the initial torque and $M_K$ denotes the pull-out torque.

Figure 6A:
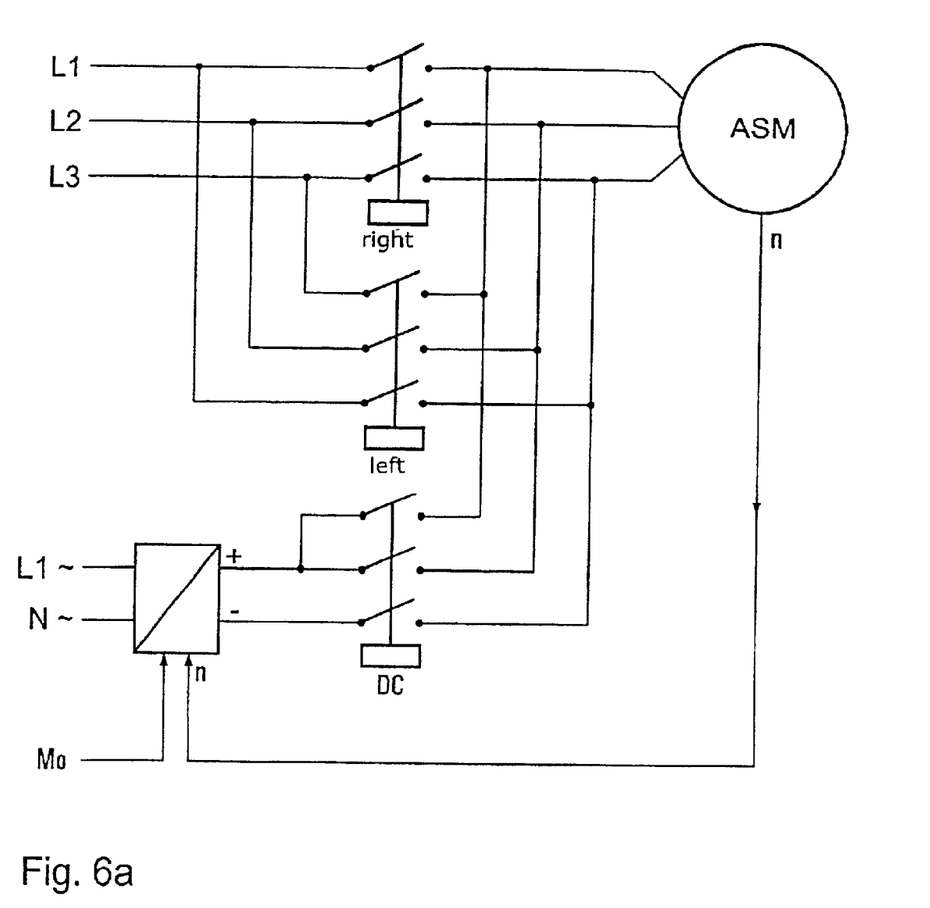
FIG. 6 shows a circuit diagram for an azimuthal motor.

After the machine housing displacement operation the four three-phase asynchronous motors (ASM) are switched off and thus no longer produce any torque. In order to uniformly decelerate the motors and also thereafter still to obtain a braking torque, the motors are supplied with a direct current promptly after separation from the three-phase network, as far as possible immediately (see FIG. 6a). That direct current produces a stationary magnetic field in the motors (asynchronous machine) which are thus immediately decelerated. That direct-current supply is maintained as far as possible during the entire stoppage time and can be regulated in respect of amplitude.

Figure 6B:
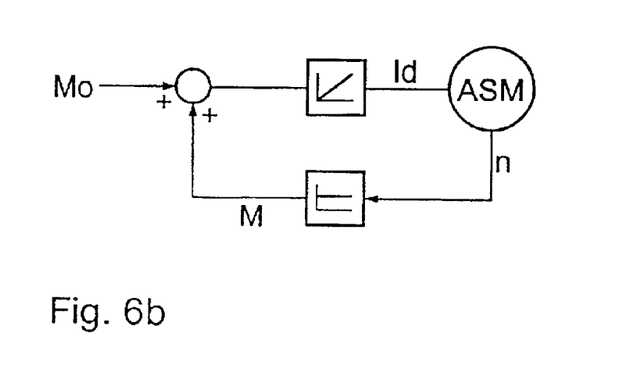

After the displacement operation the ASM-drives are supplied with a regulated direct current by means of a regulating device, as shown in FIG. 6b. Slow rotary movements of the tower top which are caused by asymmetrical gusts of wind are only damped or attenuated by a low direct current (about 10% of the nominal current), but they are permitted. Faster rotary movements are prevented by a suitably adapted higher direct current and thus a higher braking moment. In the event of very fast rotary movements, the direct current is raised to the nominal current of the motor.

Figure 3:
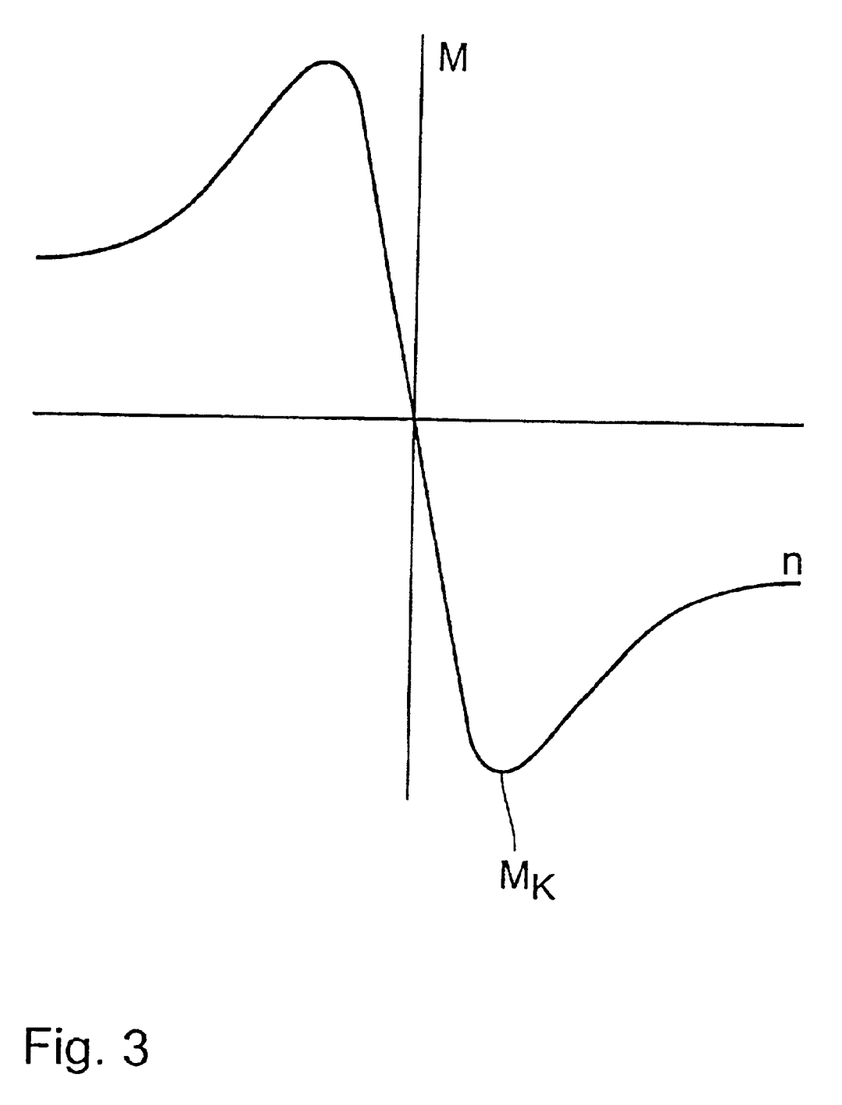
FIG. 3 shows the characteristic curve of a three-phase asynchronous motor in the direct-current mode of operation.

The torque/rotary speed characteristic curve of an asynchronous motor in the direct current mode of operation is shown in FIG. 3. The drive motor does not generate any torque with the direct current magnetization in the stopped condition. With increasing rotary speed however—up to about 6% of the nominal rotary speed—the torque generated rises linearly and this is symmetrical in both directions of rotation. In accordance with that characteristic curve, the load occurring is also distributed uniformly to all azimuthal drives and an equilibrium condition always passively occurs.

Figure 4:
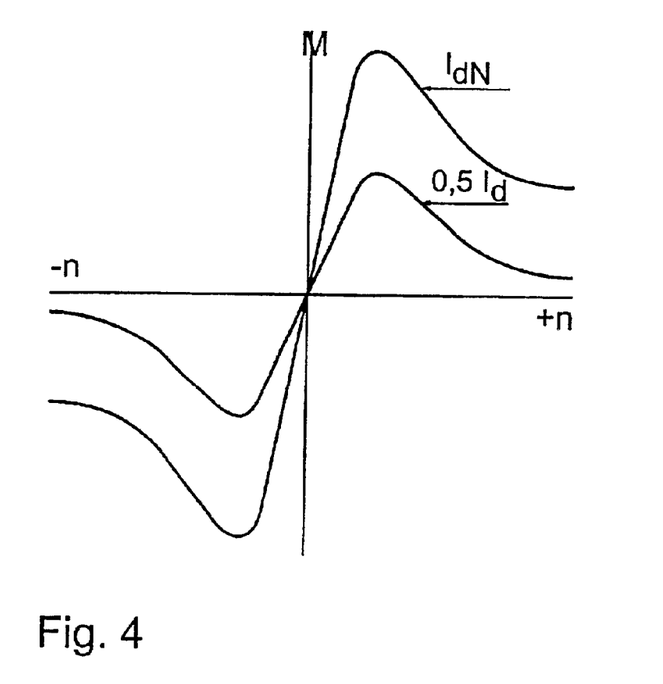
FIG. 4 shows an alternative view in relation to FIG. 3.

To provide for torque control in respect of the azimuthal drives, the gradient of the braking curve can be set linearly with the magnitude of the direct current. That is shown in FIG. 4. That affords a simple torque control for the azimuthal drives of wind power installations during the actual stoppage phase.

Figure 5:
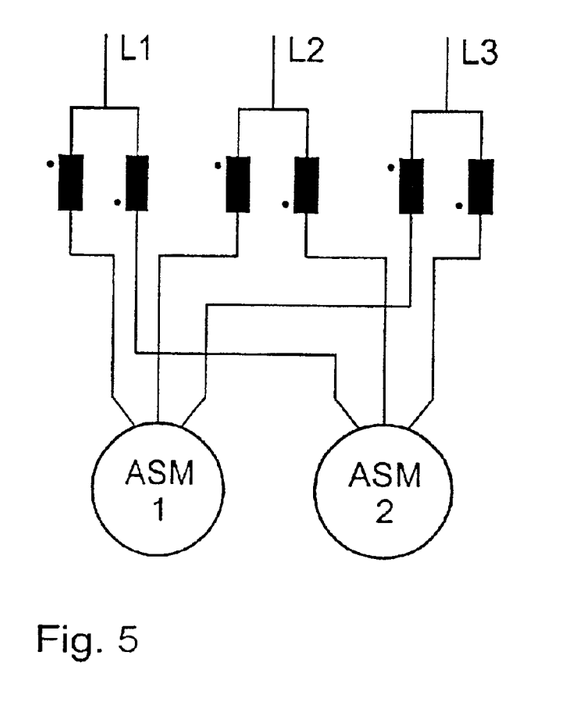
FIG. 5 shows a block circuit diagram of a current transformer coupling of two asynchronous azimuthal drives.

It is further appropriate for the individual motors of the azimuthal drives to be coupled by means of a current transformer. That is shown in FIG. 5. In this case ASM denotes an asynchronous machine. Such a simple negative feedback as illustrated stabilizes the drives.

FIG. 7 shows a partly sectional view of a known wind direction tracking arrangement with an electrical setting drive, as is known from Erich Hau, "Windkraftanlagen" ("wind power installations"), Springer-Verlag Berlin Heidelberg 1996, pages 268–271.

What is claimed is:

1. A wind power installation comprising:
    a machine housing which accommodates
        a rotor with at least one rotor blade, and
        a displacement device for displacement of the machine housing for desired orientation of the rotor in a direction of wind, wherein the displacement device has as its drive a three-phase asynchronous motor which for displacement of the machine housing is acted upon by a three-phase current and which is at times or completely acted upon with a direct current during a stoppage time of the machine housing.

2. The wind power installation as set forth in claim 1 characterized in that the three-phase asynchronous motor is acted upon with the direct current after the three-phase current is switched off, for deceleration purposes.

3. The wind power installation as set forth in claim 1 characterized in that deceleration of the three-phase asynchronous motor at the end of a displacement operation is controlled by means of a magnitude of the direct current.

4. The wind power installation as set forth in claim 1 characterized in that the displacement device has a plurality of three-phase asynchronous motors which are coupled together.

5. The wind power installation as set forth in claim 4 characterized in that the three-phase asynchronous motors are electrically coupled together by means of a current transformer.

6. A method for use in a wind power installation comprising:
    decreasing an alternating current feeding an AC azimuthal drive motor; and
    selectively adjusting a direct current feeding the AC azimuthal drive motor for said wind power installation.

7. The method of claim 6, wherein said decreasing an alternating current feeding an AC azimuthal drive motor comprises:
    decreasing a three-phase alternating current feeding a three-phase asynchronous azimuthal drive motor.

8. The method of claim 6, wherein said decreasing an alternating current feeding an AC azimuthal drive motor comprises:
    decoupling a three-phase asynchronous azimuthal drive motor from a three-phase network.

9. The method of claim 6, wherein said selectively adjusting a direct current feeding the AC azimuthal drive motor comprises:
    detecting a rotary movement of a tower top mechanically coupled with a drive shaft of a three-phase asynchronous azimuthal drive motor;
    determining an elapsed time of the rotary movement of the tower top; and
    modulating a direct current feeding the three-phase asynchronous azimuthal drive motor in response to the elapsed time of the rotary movement.

10. The method of claim 9, wherein said modulating a direct current feeding the three-phase asynchronous azimuthal drive motor in response to the elapsed time of the rotary movement comprises:
    supplying the direct current at about 10% of a nominal rated current of the three-phase asynchronous azimuthal drive motor in response to the elapsed time of the rotary movement being greater than a first specified time;
    supplying the direct current at greater than about 10% of the nominal rated current, but less than about the nominal rated current, of the three-phase asynchronous azimuthal drive motor in response to the elapsed time of the rotary movement being less than the first specified time but greater than a second specified time; and
    supplying the direct current at about the nominal rated current of the three-phase asynchronous azimuthal drive motor in response to the elapsed time of the rotary movement being less than the second specified time.

11. The method of claim 6, wherein said selectively adjusting a direct current feeding the AC azimuthal drive motor comprises:
    supplying a direct current at about 10% of a nominal rated current of a three-phase asynchronous azimuthal drive motor in response to a detected rotary velocity being less than a first specified rotary velocity;
    supplying the direct current at greater than about 10% of the nominal rated current, but less than about the nominal rated current, of the three-phase asynchronous azimuthal drive motor in response to the detected rotary velocity being greater than the first specified rotary velocity but less than a second specified rotary velocity; and
    supplying the direct current at about the nominal rated current of the three-phase asynchronous azimuthal drive motor in response to the detected rotary velocity being greater than the second specified velocity.

12. The method of claim 6, wherein said selectively adjusting a direct current feeding the AC azimuthal drive motor comprises:
    detecting a rotary force acting on a tower top mechanically coupled with a drive shaft of a three-phase asynchronous azimuthal drive motor;

determining a magnitude of the rotary force acting on the tower top; and modulating a direct current feeding a three-phase asynchronous azimuthal drive motor such that the tower top can move substantially unimpeded under action of the rotary force.

13. A wind power system comprising:

means for decreasing an alternating current feeding an AC azimuthal drive motor; and means for selectively adjusting a direct current feeding the AC azimuthal drive motor for said wind power system.

14. The system of claim 13, wherein said means for decreasing an alternating current feeding an AC azimuthal drive motor comprises:

means for decreasing a three-phase alternating current feeding a three-phase asynchronous azimuthal drive motor.

15. The system of claim 13, wherein said means for decreasing an alternating current feeding an AC azimuthal drive motor comprises:

means for decoupling a three-phase asynchronous azimuthal drive motor from a three-phase network.

16. The system of claim 13, wherein said means for selectively adjusting a direct current feeding the AC azimuthal drive motor comprises:

means for detecting a rotary movement of a tower top mechanically coupled with a drive shaft of a three-phase asynchronous azimuthal drive motor;

means for determining an elapsed time of the rotary movement of the tower top; and means for modulating a direct current feeding the three-phase asynchronous azimuthal drive motor in response to the elapsed time of the rotary movement.

17. The system of claim 16, wherein said means for modulating a direct current feeding the three-phase asynchronous azimuthal drive motor in response to the elapsed time of the rotary movement comprises:

means for supplying the direct current at about 10% of a nominal rated current of the three-phase asynchronous azimuthal drive motor in response to the elapsed time of the rotary movement being greater than a first specified time;

means for supplying the direct current at greater than about 10% of the nominal rated current, but less than about the nominal rated current, of the three-phase asynchronous azimuthal drive motor in response to the elapsed time of the rotary movement being less than the first specified time but greater than a second specified time; and means for supplying the direct current at about the nominal rated current of the three-phase asynchronous azimuthal drive motor in response to the elapsed time of the rotary movement being less than the second specified time.

18. The system of claim 13, wherein said means for selectively adjusting a direct current feeding the AC azimuthal drive motor comprises:

means for supplying a direct current at about 10% of a nominal rated current of a three-phase asynchronous azimuthal drive motor in response to a detected rotary velocity being less than a first specified rotary velocity;

means for supplying the direct current at greater than about 10% of the nominal rated current, but less than about the nominal rated current, of the three-phase asynchronous azimuthal drive motor in response to the detected rotary velocity being greater than the first specified rotary velocity but less than a second specified rotary velocity; and means for supplying the direct current at about the nominal rated current of the three-phase asynchronous azimuthal drive motor in response to the detected rotary velocity being greater than the second specified velocity.

19. The system of claim 13, wherein said means for selectively adjusting a direct current feeding the AC azimuthal drive motor comprises:

means for detecting a rotary force acting on a tower top mechanically coupled with a drive shaft of a three-phase asynchronous azimuthal drive motor;

means for determining a magnitude of the rotary force acting on the tower top; and means for modulating a direct current feeding a three-phase asynchronous azimuthal drive motor such that the tower top can move substantially unimpeded under action of the rotary force.

* * * * *